US012154398B2

(12) United States Patent
Yasumura

(10) Patent No.: US 12,154,398 B2
(45) Date of Patent: Nov. 26, 2024

(54) REMOTE OPERATION MANAGEMENT DEVICE AND REMOTE OPERATION MANAGEMENT METHOD FOR FACILITY SECURITY EQUIPMENT

(71) Applicant: SHARP KABUSHIKI KAISHA, Sakai (JP)

(72) Inventor: Yoshihide Yasumura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 29 days.

(21) Appl. No.: 17/908,783

(22) PCT Filed: Mar. 5, 2021

(86) PCT No.: PCT/JP2021/008793
§ 371 (c)(1),
(2) Date: Sep. 1, 2022

(87) PCT Pub. No.: WO2021/182346
PCT Pub. Date: Sep. 16, 2021

(65) Prior Publication Data
US 2023/0106918 A1 Apr. 6, 2023

(30) Foreign Application Priority Data
Mar. 13, 2020 (JP) .................... 2020-044285

(51) Int. Cl.
G07C 9/00 (2020.01)
G07C 9/22 (2020.01)
(52) U.S. Cl.
CPC ........... *G07C 9/00182* (2013.01); *G07C 9/22* (2020.01); *G07C 2009/00769* (2013.01)

(58) Field of Classification Search
CPC ................. G07C 9/00182; G07C 9/22; G07C 2009/00769
USPC ........................................................ 340/5.61
See application file for complete search history.

(56) References Cited

U.S. PATENT DOCUMENTS

| 9,396,599 | B1* | 7/2016 | Malhotra | G07C 9/38 |
| 10,742,939 | B1* | 8/2020 | Sommerlatt | G06Q 20/40145 |
| 11,501,618 | B1* | 11/2022 | Siminoff | H04N 23/56 |
| 2003/0016636 | A1* | 1/2003 | Tari | H04L 61/4511 370/473 |
| 2005/0002341 | A1* | 1/2005 | Lee | H04L 63/08 370/254 |

(Continued)

FOREIGN PATENT DOCUMENTS

| JP | 2003-244243 A | 8/2003 |
| JP | 2004-236083 A | 8/2004 |

(Continued)

*Primary Examiner* — Brian A Zimmerman
*Assistant Examiner* — Thang D Tran
(74) *Attorney, Agent, or Firm* — ScienBiziP, P.C.

(57) ABSTRACT

This facility security equipment remote operation management device comprises: a network communication unit that receives a remote operation instruction for security equipment connected to a private IP network of a facility; a transmission area determination unit that determines whether the instruction was received via the private IP network of the facility; and an operation instruction unit that transmits the instruction to the security equipment only if the instruction was received via the private IP network of the facility.

7 Claims, 4 Drawing Sheets

(56) References Cited

U.S. PATENT DOCUMENTS

| | | | |
|---|---|---|---|
| 2010/0125894 A1* | 5/2010 | Yasrebi | H04L 12/2818 726/4 |
| 2012/0086549 A1* | 4/2012 | Barnes, Jr. | G06Q 20/04 340/5.61 |
| 2012/0110144 A1* | 5/2012 | Rossi | H04L 61/4511 709/220 |
| 2012/0315017 A1 | 12/2012 | Matsushita et al. | |
| 2013/0014225 A1* | 1/2013 | Kageyama | H04L 67/51 726/4 |
| 2013/0067084 A1* | 3/2013 | Hershko | H04L 67/02 709/225 |
| 2013/0214902 A1* | 8/2013 | Pineau | H04L 63/101 340/5.61 |
| 2014/0269766 A1* | 9/2014 | Gopalasetty | H04W 28/065 370/473 |
| 2015/0347683 A1* | 12/2015 | Ansari | G16H 10/60 726/7 |
| 2015/0356801 A1* | 12/2015 | Nitu | G07F 9/001 340/5.61 |
| 2016/0063783 A1* | 3/2016 | Bruns | G01S 5/0295 340/5.61 |
| 2016/0134470 A1* | 5/2016 | Cregg | H04W 12/50 709/223 |
| 2016/0148451 A1* | 5/2016 | Menkveld | E05F 15/77 340/5.71 |
| 2016/0165663 A1* | 6/2016 | Shanmugam | H04W 76/12 370/338 |
| 2017/0017214 A1* | 1/2017 | O'Keeffe | G05B 15/02 |
| 2017/0041520 A1* | 2/2017 | Carlotto | H04N 23/90 |
| 2017/0241183 A1* | 8/2017 | Menkveld | G07C 9/30 |
| 2017/0264947 A1* | 9/2017 | Gerhards | H04N 21/4263 |
| 2018/0295066 A1* | 10/2018 | Pawar | H04L 47/724 |
| 2018/0309786 A1* | 10/2018 | Apelewicz | H04W 12/04 |
| 2019/0132396 A1* | 5/2019 | Finnegan | H04L 12/2818 |
| 2019/0158353 A1* | 5/2019 | Johnson | G06F 16/95 |
| 2019/0244448 A1* | 8/2019 | Alamin | G07C 9/00896 |
| 2019/0347916 A1* | 11/2019 | Wild | H04L 67/1095 |
| 2019/0385392 A1* | 12/2019 | Cho | G07C 9/00309 |
| 2020/0213146 A1* | 7/2020 | Kodam | G01N 33/0057 |
| 2020/0327757 A1* | 10/2020 | Kelley | G07C 9/00309 |

FOREIGN PATENT DOCUMENTS

| | | |
|---|---|---|
| JP | 2004-300686 A | 10/2004 |
| JP | 2012-033048 A | 2/2012 |
| JP | 2012-256994 A | 12/2012 |
| JP | 2014-195196 A | 10/2014 |

* cited by examiner

REMOTE OPERATION MANAGEMENT DEVICE AND REMOTE OPERATION MANAGEMENT METHOD FOR FACILITY SECURITY EQUIPMENT

TECHNICAL FIELD

The present invention relates to a remote operation management device and a remote operation management method for facility security equipment, and relates to a management device and a management method for performing remote operation on facility security equipment that can be remotely operated via a network.

BACKGROUND ART

In recent years, a security system in which security equipment such as a sensor or an electric lock is installed in a facility, such as a home or a business office, for the purpose of the security of the facility, and the facility security equipment is connected to a server installed in the facility via a local area network or a home network is becoming popular. The in-facility server can communicate with a server outside the facility operated by a security business operator or the like, and the security business operator monitors the facility remotely.

Meanwhile, a home energy management system (HEMS) is known in which a solar power generation device, a power storage device, electric equipment, and various sensors are connected to a controller installed in the facility via a home network or a local area network in order to monitor and control the power in the facility.

Data generated by the solar power generation device, the power storage device, the electric equipment, and the various sensors, such as power information on, for example, the power consumption of home appliances and the power generated by the solar power generation device, are sequentially transmitted to a HEMS controller in the facility. The data collected by the HEMS controller is uploaded to a management server outside the facility via the Internet.

The user can access a web site provided by the management server using a mobile information terminal that can connect to the Internet, and can browse the power information on, for example, the power consumption of home appliances and the power generated by a solar battery panel. In addition, the user can set up and operate electric equipment in the facility via the website. For example, the user can set timers for air conditioning and cooking equipment, or remotely operate the air conditioning and cooking equipment in their home before returning home.

Upon receipt of the user's instruction on the web site, the management server sends the instruction to the HEMS controller of the target facility. After receiving the instruction from the management server, the HEMS controller sends the instruction to the target equipment. In this way, the user's setting and operation are remotely sent to the target equipment.

The in-facility server related to the security of the facility and the HEMS controller have different purposes but share some aspects. There is also a mode in which the HEMS controller serves as an in-facility server instead of separately installing an in-facility server dedicated to security and a HEMS controller.

An electronic lock that can be remotely operated has been proposed for remote operation on facility security equipment. The remote operation is performed through authentication means and instruction signal generation means installed in a management center outside the facility. When an operation request for the electronic lock is received from a user terminal, the authentication means authenticates the user using voice print data or an atypical sentence generated for authentication. When the validity of the user is confirmed, the instruction signal generating means generates an instruction signal for operating the electronic lock (for example, see Patent Literature 1).

CITATION LIST

Patent Literature

[PL1] Japanese Unexamined Patent Application Publication No. 2004-300686

SUMMARY OF INVENTION

Technical Problem

Protection against impersonation and erroneous operation is more important for remote operation on facility security equipment than in usual equipment. If a third party can impersonate a user and operate security equipment, the facility is no longer secure. In addition, even if the operation is performed by a true user, the facility is no longer secure if the security is unlocked by an erroneous operation.

As a countermeasure, the facility security equipment may accept only direct operation by the user, without accepting remote operation. By doing so, the risk that a third party steals a password or the like and impersonates the user to remotely operate the facility security equipment can be eliminated. However, it is undeniable that while the risk is reduced, the convenience of the user is impaired.

For example, let us consider the case where an electric lock can be locked by remote operation but cannot be unlocked by remote operation. Consider the case where the user inadvertently going out of the house without locking the door. Then, suppose that the user notices that he/she forgot to lock the door after going out. In this case, if the electric lock can be locked by remote operation, the user's forgetting to lock the door is recovered from that point of time and the security of the house is ensured.

However, if the user leaves the key of the electric lock at home, the user is locked out because the door cannot be unlocked by remote operation. Such a situation does not occur if remote operation of not only unlocking but also locking is prohibited. However, this impairs the great convenience of electric locks over ordinary locks.

The present invention has been made in consideration of the above-described circumstances, and provides a method capable of reducing the risk that security equipment of a facility is remotely operated via a network by impersonation.

Solution to Problem

The present invention provides a remote operation management device for facility security equipment, the remote operation management device including: a network communication unit configured to receive an instruction for remote operation on security equipment connected to a private IP network of a facility; a transmission area determination unit configured to determine whether or not the instruction has been received via the private IP network; and an operation instruction unit configured to send the instruction to the security equipment only when the instruction has been received via the private IP network.

From a different point of view, the present invention also provides a remote operation management method for facility security equipment, comprising: receiving an instruction for remote operation on security equipment connected to a private IP network of a facility; determining whether or not the instruction has been received via the private IP network; and sending the instruction to the security equipment only when the instruction has been received via the private IP network.

Advantageous Effects of Invention

The remote operation management device for facility security equipment according to the present invention includes a transmission area determination unit configured to determine whether or not an instruction for remote operation has been received via a private IP network of the facility, and an operation instruction unit configured to send the instruction to the security equipment only when the instruction has been received via the private IP network, so that the risk that the security equipment of the facility is remotely operated via a network by impersonation can be reduced.

The remote operation management method for facility security equipment according to the present invention also provides the same advantageous effect.

DESCRIPTION OF EMBODIMENTS

Hereinafter, the present 62 invention will be described in more detail with reference to the drawings. The following description is illustrative in all respects and should not be construed as limiting the present invention.

First Embodiment

Figure 1:
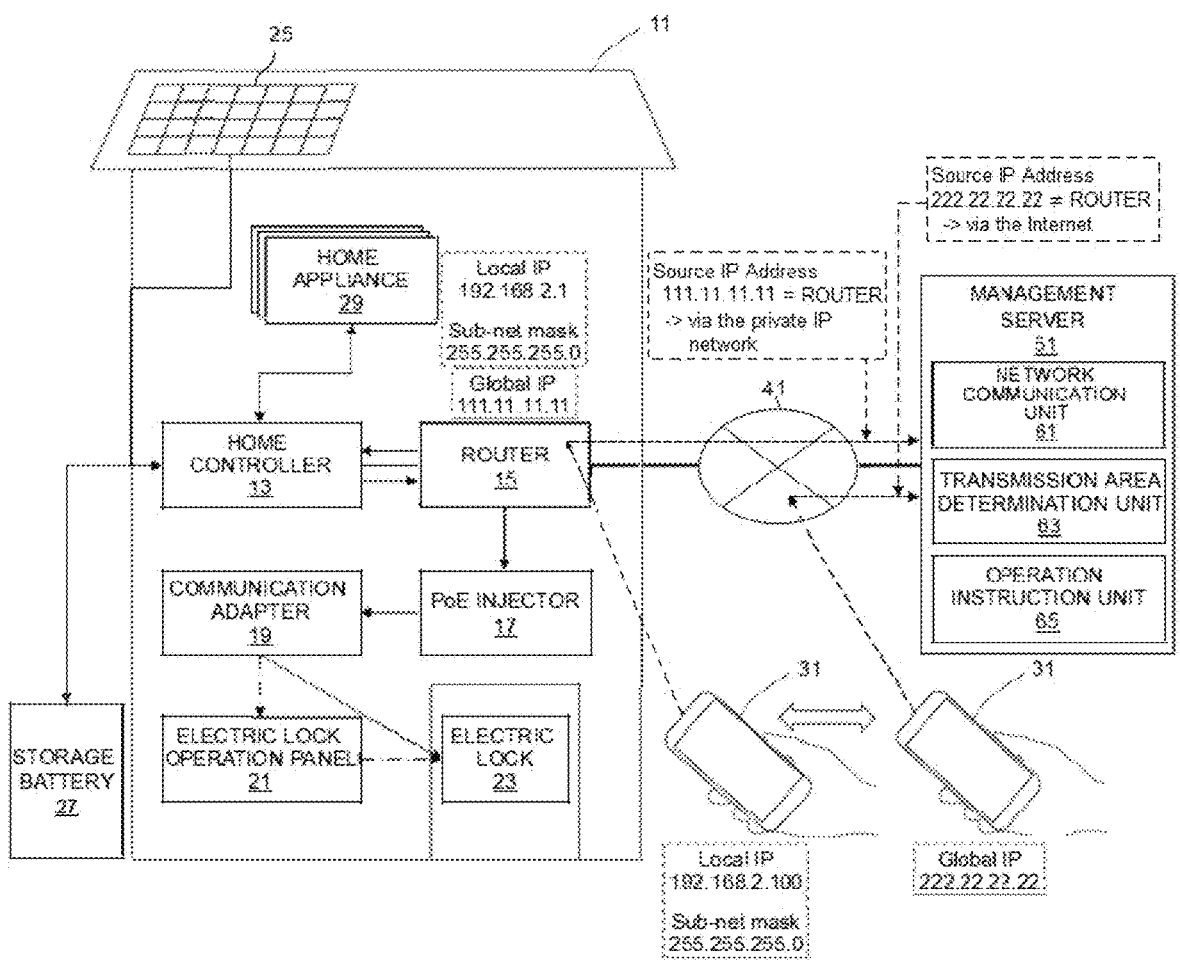
FIG. 1 is a block diagram showing a configuration of a HEMS and security system of a house in a first embodiment.

FIG. 1 is a block diagram showing a configuration of a home HEMS and security system in the present embodiment.

As shown in FIG. 1, a home controller 13 serving as an in-facility server of the HEMS and security system is installed in a house 11 serving as a facility. The home controller 13 communicates with a solar power generation device 25, a storage battery 27, and home appliance(s) 29 of the house 11. The home controller 13 also communicates with a management server 51 outside the house via a router 15 and the Internet 41. Data generated by the solar power generation device 25, the power storage device 27, the home appliances 29, and various sensors (not shown), such as power information on, for example, the power consumption of the home appliances 29 and the power generated by the solar power generation device 25, are sequentially transmitted to the home controller 13. The data collected by the home controller 13 is uploaded to the management server 51 outside the house via the router 15 and the Internet 41.

The home controller 13 of the house 11 is connected to the solar power generation device 25, the storage battery 27, and the home appliances 29 by a private IP network.

Further, the router 15 is connected to an electric lock operation panel 21 via a PoE injector 17 and a communication adapter. The electric lock operation panel 21 unlocks and locks an electric lock 23 serving as security equipment provided at the entrance of the house 11.

The router 15 and the communication adapter 19 are connected to each other by a wired private IP network. The PoE injector 17 supplies electric power to the communication adapter 19. The communication adapter 19 supplies electric power to the electric lock operation panel 21 and the electric lock 23. In the present embodiment, a proprietary signal, not an IP network, connects between the communication adapter and the electric lock operation panel 21, and between the electric lock operation panel 21 and the electric lock 23.

The home controller 13 communicates with the electric lock operation panel 21 via the router 15 and the communication adapter 19 to operate the electric lock 23. As a different mode, the communication adapter 19 may directly send a signal to the electric lock 23 for the operation, not via the electric lock operation panel 21. Further, the electric lock operation panel 21 may include the functions of the communication adapter 19 and the PoE injector 17.

The router 15 connects the private IP network to which the home controller 13 and the communication adapter 19 are connected to the Internet. The home controller 13 communicates with the management server 51 on the Internet via the router 15.

Further, the router 15 is provided with a function of communication by wireless local area network (LAN), such as a Wi-Fi system, as short-range wireless communication, and can connect a smartphone 31 or other wireless communication devices connected to the router 15 via wireless LAN to the Internet (see FIG. 1). The smartphone 31 is connected to the Internet via the router 15 when the smartphone 31 is within a short-range wireless communication range of the router 15. On the other hand, when the smartphone 31 is not within the short-range wireless communication range of the router 15, the smartphone 31 is connected to the Internet via a mobile communication system having a wider communication range than short-range wireless communication (e.g., a wireless communication system using a communication circuit standard such as LTE, 4G, or 5G) or a wireless LAN router or the like installed in a place other than the house 11.

<<Mode in which Management Server Manages Remote Operation on Electric Lock>>

A mode in which the management server 51 manages remote operation on the electric lock 23 will be described. In the present embodiment, it is assumed that the user performs remote operation on the electric lock 23 using the smartphone 31 as a mobile communication terminal. Here, the smartphone 31 is owned by the user. Remote operation on the electric lock 23 is performed by accessing a web page provided by the management server 51. The web page of the management server 51 is operated by a business operator who operates the HEMS of the house 11. Since the management server 51 is on the Internet, browsing of the web page is also performed by accessing the Internet.

FIG. 1 shows two modes in which the smartphone 31 accesses the Internet.

In the mode shown on the left side, the smartphone 31 is connected to the router 15 in the house 11 by wireless LAN and accesses the Internet via the router 15. In this case, the user is within an area where the user can connect to the router 15 by wireless LAN, i.e., within a range of several tens of meters of the router 15.

When viewed from the management server 51, the smartphone 31 communicating via the Internet through the router 15 is connected to a private IP network under the router 15, and is assigned a global IP address by the router 15. On the private IP network, the smartphone 31 and the router 15 communicate with each other using their respective local IP addresses. In the example shown in FIG. 1, the local IP address of the smartphone is 192.168.2.100, and the local IP address of the router 15 is 192.168.2.1.

On the Internet, the router 15 converts the local IP address of the smartphone into a unique global IP address on the Internet. For the Internet connection in a house or a business office, it is common to contract with an Internet service provider to rent and use a global IP address, and this is assumed to be the case in the present embodiment as well. In the example shown in FIG. 1, the global IP address is 111.11.11.11.

As the IP address, any one in the range from 0.0.0.0 to 255.255.255.255 can be assigned, and it is provided as a universal rule that the range of IP addresses that can be assigned to private addresses is any one in the range from 10.0.0.0 to 10.255.255.255, from 172.16.0.0 to 172.31.255.255, and from 192.168.0.0 to 192.168.255.255. Therefore, whether or not the IP address is a local IP address can be determined based on whether or not upper digits of the IP address fall within the above range.

Further, whether or not the IP address belongs to the private IP network of the router 15 can be determined using a sub-net mask indicating a boundary between the network portion and the host portion of the IP address. If the network portion of the IP address is the same as that of the communication adapter 19, it can be determined that the IP address belongs to the same private IP network as the communication adapter 19.

In the example shown in FIG. 1, since the sub-net mask relating to the local IP address is 255.255.255.0, the network portion of the IP address of the communication adapter 19 is the upper digits 192.168.2. It can be determined that the other devices having the same network portion of the local IP address 192.168.2 belong to the same private IP network as the communication adapter 19.

It should be noted that the above description is, but is not limited to, based on the IPv4 address system, which is still the mainstream today. The equivalents of the IPv4 global IP address and local IP address exist as an IPv6 global unicast address and a unique local unicast address (also referred to as a unique local address). Therefore, the remote operation management method according to the present embodiment can also be applied to IPv6.

The router 15 assigns a unique local IP address not only to the smartphone 31 but also to each communication device connected to the private IP network. On the Internet, each local IP address is converted into the global IP address of 111.11.11.11 for communication.

Therefore, when viewed from the management server 51 on the Internet, the IP address of the smartphone 31 is 111.11.11.11, which is the same as those of the router 15 and the other communication devices connected to the private IP network.

In the present embodiment, when a business operator or the like who operates the HEMS opens a HEMS website for the house 11 on the management server 51, the business operator registers, in the home controller 13 and the management server 51, each other's IP addresses. Thus, the management server 51 and the home controller 13 can communicate with each other.

The management server 51 determines whether or not an instruction for unlocking the electric lock 23 has been received via the private IP network of the house 11 in which the home controller 13 is installed. The determination can be made by using the registered IP address of the home controller, its sub-net mask, and the source IP address of the instruction.

In FIG. 1, the right side shows a mode in which the smartphone 31 is not connected to the router 15 in the house 11 by wireless LAN, but is connected to the Internet via a mobile communication system or a router installed in a place other than the house 11. In this case, the user is considered to be outside the wireless LAN connection area of the router 15.

When viewed from the management server 51 on the Internet, the IP address of the smartphone 31 is different from the global IP address 111.11.11.11 of the router 15.

In the present embodiment, the management server 51 manages remote operation on the electric lock 23. That is, the management server 51 functions as a remote operation management device.

As shown in FIG. 1, the management server 51 includes a network communication unit 61, a transmission area determination unit 63, and an operation instruction unit 65 as functions relating to remote operation management.

The network communication unit 61 receives a remote operation instruction for unlocking the electric lock 23 from the smartphone 31.

When receiving the remote operation instruction for unlocking the electric lock 23, the transmission area determination unit 63 refers to the source IP address of the instruction.

When the source IP address is 111.11.11.11, that is, when it matches the IP address of the router 15 of the house 11 in which the electric lock 23 is installed, the transmission area determination unit 63 determines that the instruction for unlocking has been received wirelessly via the router 15.

The operation instruction unit 65 sends an unlocking instruction to the home controller 13 based on the determination result of the transmission area determination unit 63. The sent unlocking instruction is sent to the home controller 13 via the router 15, and is sent from the home controller 13 to the communication adapter 19. After receiving the unlocking instruction from the management server 51, the communication adapter 19 sends the unlocking instruction to the electric lock operation panel 21. After receiving the unlocking instruction, the electric lock operation panel 21 unlocks the electric lock 23.

As described above, when a remote operation instruction for unlocking provided by the user using the smartphone 31 is wirelessly received by the router 15, the electric lock 23 is unlocked in accordance with the instruction.

Prior to sending the unlocking instruction to the home controller 13 based on the determination result of the transmission area determination unit 63, the operation instruction unit 65 may perform a user authentication procedure. For example, user authentication is performed by a procedure such as requesting input of a predetermined password. This can more reliably prevent impersonation by a third party.

Meanwhile, a case where the transmission area determination unit 63 receives a remote operation instruction for unlocking and the source IP address of the instruction is not 111.11.11.11 will be described. That is, a case where the source IP address of the instruction does not match the IP address of the router 15 of the house 11 in which the electric lock 23 is installed will be described. In this case, the transmission area determination unit 63 determines that the instruction for unlocking has not been received wirelessly via the router 15.

The operation instruction unit 65 refrains from sending the unlocking instruction to the communication adapter 19 based on the determination result of the transmission area determination unit 63. Therefore, in this case, the electric lock 23 is not unlocked.

As described above, when the remote operation instruction for unlocking provided by the user using the smartphone 31 has not been received wirelessly by the router 15, that is, when it has not been received via the private IP network under the router 15, the electric lock 23 is not unlocked by remote operation.

In order to unlock the electric lock 23 by remote operation, the remote operation needs to be performed via a private IP network from within an area where Wi-Fi connection to the router 15 of the house 11 is possible, i.e., from near the house 11.

Figure 2:
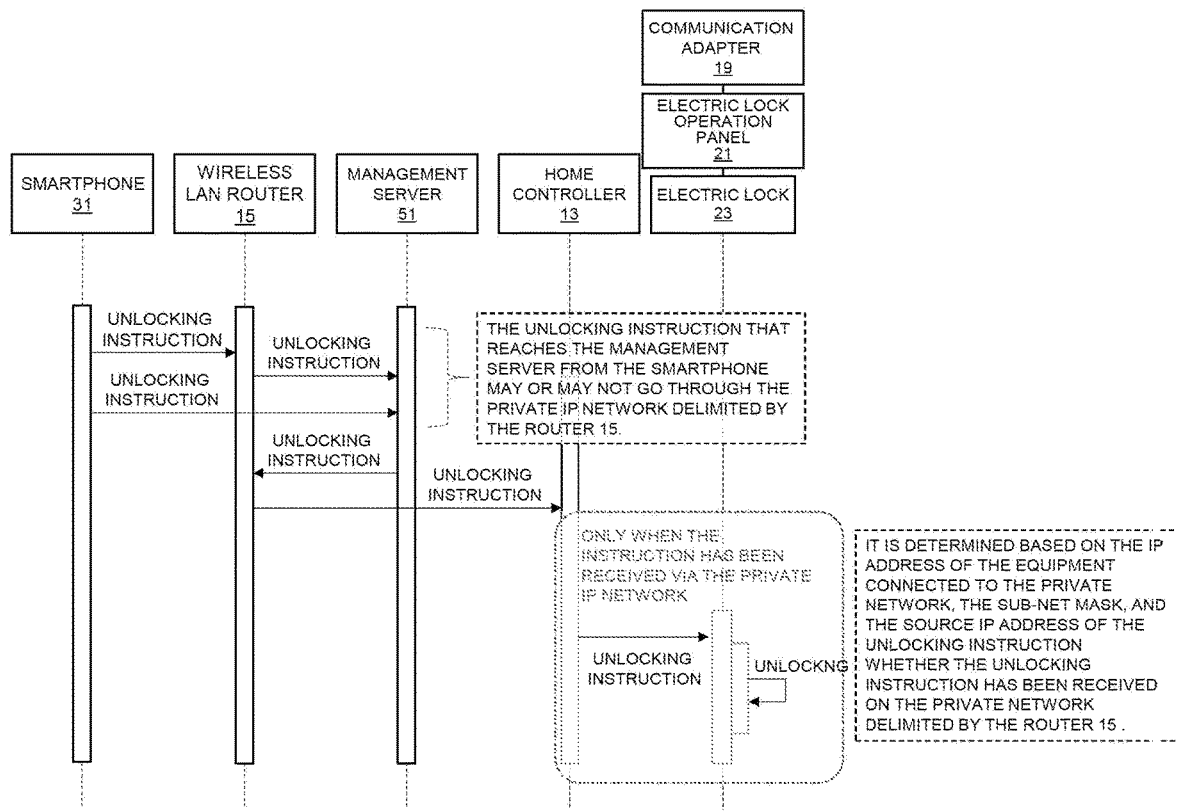
FIG. 2 is an explanatory diagram showing a communication flow until an electric lock is unlocked by remote operation in the first embodiment.

FIG. 2 is an explanatory diagram showing a communication flow until the electric lock 23 is unlocked by remote operation in the present embodiment. As shown in FIG. 2, an instruction to unlock the electric lock 23 transmitted by the user operating the smartphone 31 is sent to the management server 51 via or not via the router 15. After the management server 51 receives the unlocking instruction, the transmission area determination unit 63 determines whether or not the instruction has been received via the private IP network under the router 15. When it is determined that the instruction has been received through the private IP network, the operation instruction unit 65 of the management server 51 sends the unlocking instruction to the home controller 13. The unlocking instruction is sent to the home controller 13 via the router 15. The home controller 13 sends the received unlocking instruction to the communication adapter 19, and the communication adapter 19 sends it to the electric lock operation panel 21 to unlock the electric lock 23.

Now consider a case where the user forgets to lock the electric lock 23 and goes out, and also forgets to take out the key. After going out, the user who realizes that he/she forgot to lock the electric lock 23 can lock it by remote operation. In this case, when the user returns to the house 11, the user can unlock the electric lock 23 by remote operation even if the user does not have the key. Therefore, the convenience of the user by remote operation is ensured.

Meanwhile, even if a third party tries to unlock the electric lock 23 by remote operation via the Internet by impersonation, the electric lock 23 is not unlocked unless the remote operation is performed from near the house 11.

In the present embodiment, the case where the management server 51 of the HEMS on the Internet functions as the remote operation management device has been described, but the management server 51 is merely an example and the remote operation management device is not particularly limited as long as it is a communication device on the Internet.

Second Embodiment

Described in the first embodiment is the mode in which the home controller 13 related to the HEMS receives remote operation on the electric lock 23 from the management server 51. However, the remote operation does not necessarily have to be associated with the HEMS, and the home controller 13 does not have to receive a remote operation instruction.

In the present embodiment, a mode in which there is no home controller 13 shown in FIG. 1, or even if there is a home controller 13, remote operation on the electric lock 23 is performed not via the home controller 13 will be described.

In the present embodiment, the unlocking instruction from the management server 51 is sent to the communication adapter 19 via the router 15. In the present embodiment, it is assumed that, when the electric lock is installed, the business operator or the like who installed the electric lock or the user registers, in the management server 51, the IP address of the communication adapter 19, which is the destination.

Figure 3:
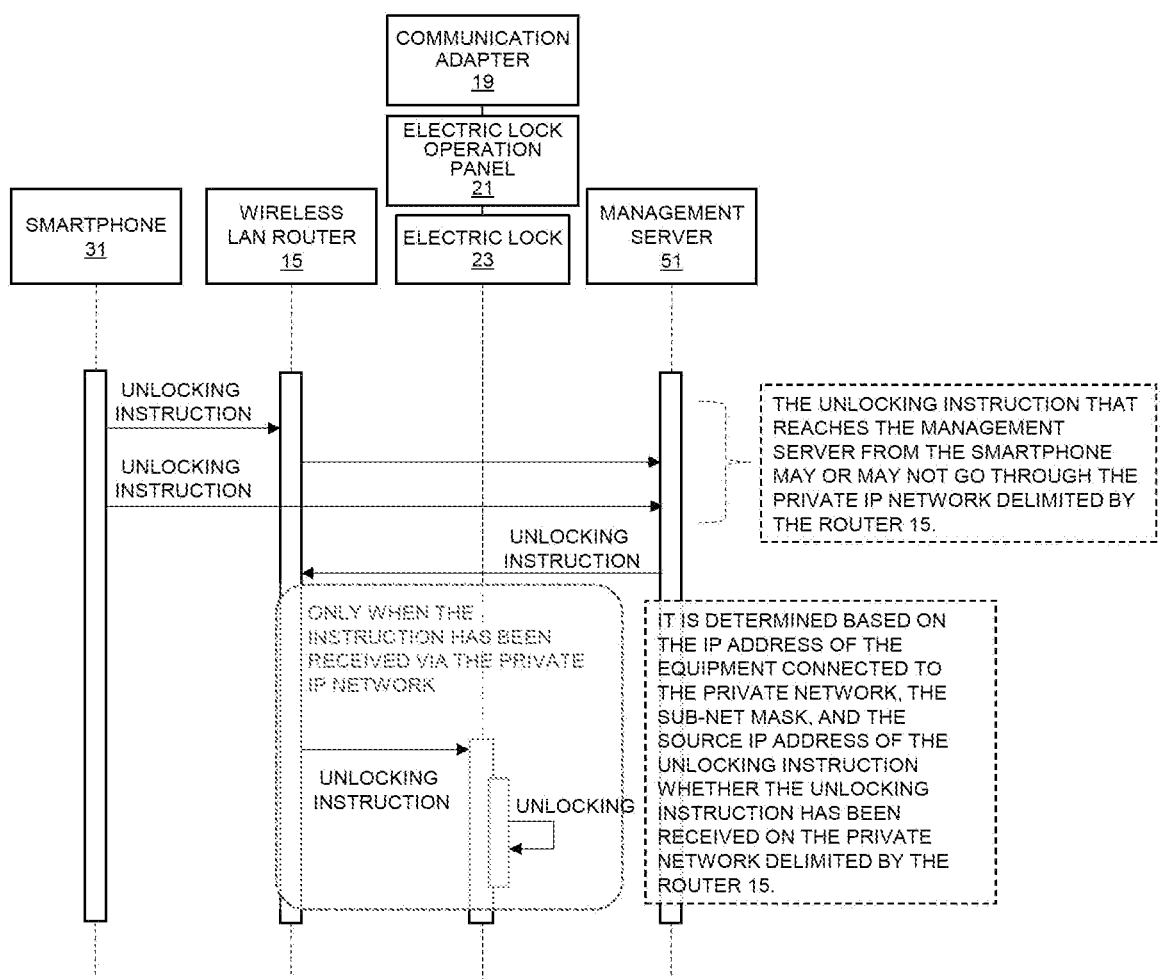
FIG. 3 is an explanatory diagram showing a communication flow different from that in FIG. 2 until the electric lock is unlocked by remote operation in a second embodiment.

FIG. 3 is an explanatory diagram showing a communication flow until the electric lock is unlocked by remote operation in the present embodiment. Unlike FIG. 2, the home controller 13 is not involved in communication. The instruction to unlock the electric lock 23 transmitted by the user operating the smartphone 31 is sent to the management server 51 via or not via the router 15 as in FIG. 2. After receiving the unlocking instruction, the management server 51 sends the unlocking instruction to the communication adapter 19, unlike FIG. 2, when sending it as a result of the determination. The unlocking instruction is sent to the communication adapter 19 via the router 15. After receiving the unlocking instruction, the communication adapter 19 sends it to the electric lock operation panel 21, and the electric lock 23 is unlocked.

Third Embodiment

Described in the first embodiment is the mode in which the management server 51 on the Internet functions as the remote operation management device.

In contrast, in the present embodiment, a mode in which the home controller 13 installed in the house 11 functions as the remote operation management device will be described. It should be noted that the home controller 13 is merely an example, and for example, the communication adapter 19 may function as the remote operation management device, or any communication device to which a local IP address is assigned by the router 15 may be used instead of the communication adapter 19.

Figure 4:
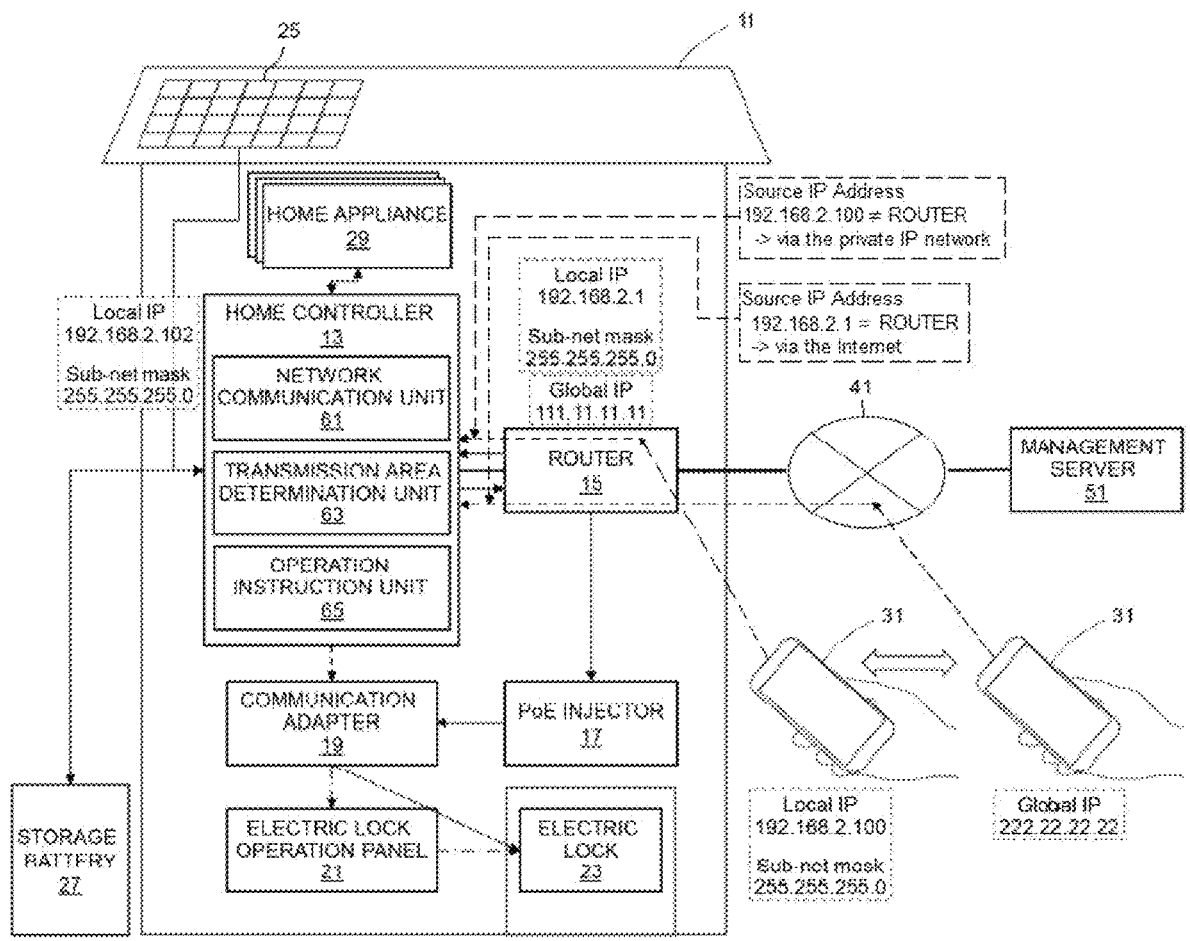
FIG. 4 is a block diagram showing a configuration of a HEMS and security system of a house in a third embodiment.

FIG. 4 is a block diagram showing a configuration of the HEMS and security system of the house in the present embodiment, and corresponds to FIG. 1. Descriptions of portions similar to those in FIG. 1 will be omitted.

In FIG. 1, the management server 51 includes the network communication unit 61, the transmission area determination unit 63, and the operation instruction unit 65, whereas in FIG. 4, the home controller 13 includes these units. When the remote operation on the electric lock 23 does not relate to the HEMS, the communication adapter 19 may includes these units instead of the home controller 13.

The user performs remote operation on the electric lock 23 using the smartphone 31 as in the first embodiment. However, in the present embodiment, the screen for remote operation is provided by, for example, an application installed in the smartphone 31, and the unlocking instruction is made on the application and sent from the smartphone 31 to the home controller 13. In the present embodiment, it is assumed that, when the application is installed, the user registers, in the application, the IP address of the home controller 13, which is the destination.

FIG. 4 shows two modes in which the smartphone 31 accesses the Internet.

In the mode shown on the left side, the smartphone 31 is connected to the router 15 in the house 11 via wireless LAN and accesses the home controller 13 on the private IP network via the router 15 not via the Internet. In this case, the user is within an area where the user can connect to the router 15 by wireless LAN, i.e., within a range of several tens of meters of the router 15.

When viewed from the home controller 13, the smartphone 31 is connected to the router 15 via Wi-Fi and is a party to communicate with in the private IP network. On the private IP network, the smartphone 31 and the router 15 communicate with each other with their unique local IP addresses. In the example shown in FIG. 4, the local IP address of the smartphone is 192.168.2.100, and the local IP address of the router 15 is 192.168.2.1.

In the mode shown on the right side, the smartphone 31 is not connected to the router 15 via wireless LAN and accesses the home controller 13 on a private IP network via the router 15 via the Internet. In this case, the user is considered to be outside the wireless LAN connection area of the router 15.

When viewed from the home controller 13, the IP address of the smartphone 31 in the same private IP network as the home controller 13 is the local IP address of the router 15, which is the entrance to the Internet, and is 192.168.2.1 in the example shown in FIG. 4.

The network communication unit 61 of the home controller 13 receives a remote operation instruction for unlocking the electric lock 23 from the smartphone 31.

When receiving the remote operation instruction for unlocking the electric lock 23, the transmission area determination unit 63 refers to the source IP address of the instruction.

When the source IP address is other than the local IP address 192.168.2.1 of the router 15 (192.168.2.100 in the example of FIG. 4), the transmission area determination unit 63 determines that the instruction for unlocking has been received wirelessly in the private IP network under the router 15.

The operation instruction unit 65 sends the unlocking instruction to the communication adapter 19 based on the determination result of the transmission area determination unit 63. After receiving the unlocking instruction from the management server 51, the communication adapter 19 sends the unlocking instruction to the electric lock operation panel 21. After receiving the unlocking instruction, the electric lock operation panel 21 unlocks the electric lock 23.

As described above, when a remote operation instruction for unlocking provided by the user using the smartphone 31 is wirelessly received by the router 15, the electric lock 23 is unlocked in accordance with the instruction.

Meanwhile, a case will be described in which the transmission area determination unit 63 receives a remote operation instruction for unlocking and the IP address of the source of the instruction in the same private IP network as the home controller 13 is the local IP address 192.168.2.1 of the router 15 as viewed from the home controller 13. In this case, the transmission area determination unit 63 determines that the instruction for unlocking has been received via the Internet.

The operation instruction unit 65 refrains from sending the unlocking instruction to the communication adapter 19 based on the determination result of the transmission area determination unit 63. Therefore, in this case, the electric lock 23 is not unlocked. As described above, when the remote operation instruction for unlocking provided by the user using the smartphone 31 has not been received wirelessly by the router 15, the electric lock 23 is not unlocked even if the instruction has been provided.

As in the first embodiment, in order to unlock the electric lock 23 by remote operation, the remote operation needs to be performed from within an area where Wi-Fi connection to the router 15 of the house 11 is possible, that is, from near the house 11.

Fourth Embodiment

In the present embodiment, several countermeasures for preventing the electric lock 23 from being unlocked by a user's erroneous operation will be described.

As a first countermeasure, it is conceivable that the operation instruction unit 65 requests the user to input an unlocking confirmation before sending an unlocking instruction to the home controller 13. An erroneous operation can be prevented by requesting the user to input a confirmation before executing unlocking by remote operation.

As a second countermeasure, a sensor for detecting the open/close state is provided on the door on which the electric lock 23 is installed, and information on opening/closing of the door is received by the home controller 13 from the sensor. If the door is not brought into the open state within a predetermined period of time after the operation instruction unit 65 sends an unlocking instruction, the operation instruction unit 65 sends an instruction to lock the electric lock 23 to the home controller 13.

This can prevent the door from being left unlocked when the user accidentally unlocks the electric lock by remote operation.

As described above,
(i) the remote operation management device for facility security equipment according to the present invention is characterized by including: a network communication unit configured to receive an instruction for remote operation on security equipment connected to a private IP network of a facility; a transmission area determination unit configured to determine whether or not the instruction has been received via the private IP network; and an operation instruction unit configured to send the instruction to the security equipment only when the instruction has been received via the private IP network.

The security equipment is equipment related to the security of the facility. The specific forms thereof are, for example, an electric lock, a shutter, and an opening/closing device for an electric window. The electric lock in the above-described embodiments corresponds to the security equipment of the present invention. The security equipment operates in response to an instruction sent from the operation instruction unit.

Furthermore, the transmission area determination unit and the operation instruction unit include, as hardware, circuits such as a central processing unit (CPU) and a memory as well as an input/output circuit. These hardware resources and control programs as software resources are organically combined to realize their functions. That is, the functions are realized by the CPU executing the control programs stored in the memory. A micro processing unit (MPU) is also one form of the CPU described above.

Further, preferred modes of the present invention will be described.

(ii) The private IP network may be an IP network delimited by a router connected to the Internet, reception via the private IP network may include receiving the instruction from a mobile communication terminal capable of short-range wireless communication by a short-range wireless communication device connected to the private IP network, the network communication unit may receive the instruction via the Internet via or not via the private IP network, and when an IP address related to the reception of the instruction includes a local IP address of the private IP network, the transmission area determination unit may determine that the instruction has been received via the private IP network.

In this way, it is possible to reduce the risk that the security equipment of the facility is remotely operated by impersonation with an instruction via the Internet from a place far from the facility.

In the present invention, the short-range wireless communication has a wireless communication range within several tens of meters. The specific form thereof is, for example, wireless communication by wireless LAN such as a Wi-Fi system or Bluetooth (registered trademark), but is not limited thereto.

Further, the short-range wireless communication device performs transmission and reception with a mobile communication terminal or the like capable of short-range wireless communication by means of the short-range wireless communication. The specific form thereof is, for example, the wireless router as described in the above embodiments.

The network is used for communication between the short-range wireless communication device and the remote operation management device. The specific form thereof is, for example, the Internet or a private IP network in a facility. The private IP network includes a network using the short-range wireless communication described above, but may also include a wired network. The Internet or private IP network in the above embodiments corresponds to the network of the present invention.

The mobile communication terminal is capable of transmitting an instruction for remote operation on security equipment by using at least short-range wireless communication. The specific form thereof is, for example, a mobile information device having a communication function such as a smartphone or a tablet terminal. The smartphone in the above embodiments corresponds to the communication terminal of the present invention.

In the vicinity of the router, the mobile communication terminal is connected to the private IP network of the router by short-range wireless communication.

The security equipment is connected to the private IP network of the router by short-range wireless communication or another communication system.

(iii) The private IP network may be an IP network delimited by a router connected to the Internet, reception via the private IP network may include receiving the instruction from a mobile communication terminal capable of short-range wireless communication by a short-range wireless communication device connected to the private IP network, the network communication unit may receive the instruction via the private IP network via or not via the Internet, and the transmission area determination unit may determine that the instruction has been received via the Internet when an IP address related to the reception of the instruction includes a local IP address other than a local IP address of the private IP network, and may determine that the instruction has been received via the private IP network when the IP address related to the reception of the instruction includes only the local IP address of the private IP network.

In this way, it is possible to reduce the risk that the security equipment of the facility is remotely operated by impersonation with an instruction via the Internet from a place far from the facility.

The mobile communication terminal is capable of transmitting an instruction for remote operation on security equipment by using at least short-range wireless communication. The specific form thereof is, for example, a mobile information device having a communication function such as a smartphone or a tablet terminal. The smartphone in the above embodiments corresponds to the communication terminal of the present invention.

In the vicinity of the router, the mobile communication terminal is connected to the private IP network of the router by short-range wireless communication.

The security equipment is connected to the private IP network of the router by short-range wireless communication or another communication system.

(iv) The security equipment may be an electric lock, and the instruction may be an unlocking instruction to unlock the electric lock.

In this way, the risk that the electric lock of the facility is unlocked by remote operation via the network by impersonation can be reduced.

(v) The network communication unit may receive information on opening and closing from an open/close sensor configured to detect opening and closing of a door on which the electric lock is installed, and the operation instruction unit may send a locking instruction to the electric lock when the open/close sensor does not detect an open state within a predetermined time after sending the unlocking instruction to the electric lock.

In this way, when the user accidentally unlocks the electric lock by remote operation, the electric lock can be prevented from being left unlocked.

(vi) When the instruction has been received via the private IP network, the operation instruction unit may request the mobile communication terminal for information relating to user authentication, and send the instruction to the security equipment when the information is acquired from the mobile communication terminal.

In this way, by further performing user authentication before sending the remote operation instruction, the risk that the security equipment of the facility is operated from a place far from the facility via the Internet by impersonation can be more surely reduced.

(vii) When the instruction has been received via the private IP network, the operation instruction unit may request the communication terminal for input of a confirmation by the user, and may send the instruction to the security equipment when the confirmation is input on the communication terminal.

In this way, when the user erroneously provides an instruction for remote operation, the user can notice the erroneous operation as the user is required to input a confirmation.

(viii) The preferred modes of the present invention include a remote operation management method for facility security equipment, comprising: receiving an instruction for remote operation on security equipment connected to a private IP network of a facility; determining whether or not the instruction has been received via the private IP network; and sending the instruction to the security equipment only when the instruction has been received via the private IP network.

Preferred modes of the present invention include a combination of any of the above-described modes.

In addition to the embodiments described above, there may be various modifications of the present invention. These modifications should not be construed as not falling within the scope of the present invention. This invention should include all modifications equivalent to the claims and within the above scope.

EXPLANATION OF REFERENCE NUMERALS

11: house, 13: home controller, 15: router, 17: PoE injector, 19: communication adapter, 21: electric lock operation panel, 23: electric lock, 25: solar power generation device, 27: storage battery, 29: home appliance(s), 31: smartphone, 41: Internet, 51: management server, 61: network communication unit, 63: transmission area determination unit, 65: operation instruction unit

The invention claimed is:

1. A remote operation management device for unlocking/locking or opening/closing facility security equipment related to security of a facility, the remote operation management device comprising:
    a network communication unit configured to receive an instruction for a remote operation to unlock/lock or open/close the facility security equipment connected to a private Internet Protocol (IP) network of the facility from a device connected to the private IP network or to the Internet;
    a transmission area determination unit configured to determine if the instruction for unlocking or opening has been received via the private IP network, delimited by a router, or via the Internet; and
    an operation instruction unit configured to:
        send the instruction for unlocking or opening to the facility security equipment only when the instruction for unlocking or opening has been received via the private IP network, and
        refrain from sending the instruction for unlocking or opening to the facility security equipment when the instruction for unlocking or opening has been received via the Internet, wherein
    the facility security equipment locks/unlocks or opens/closes in response to the instruction for unlocking or opening received from the operation instruction unit,
    the reception of the instruction for unlocking or opening via the private IP network comprises reception of the instruction for unlocking or opening from a mobile communication terminal using short-range wireless communication via a short-range wireless communication device connected to the private IP network, and
    the facility security equipment comprises an electric lock, a shutter, or an opening/closing device for an electric window.

2. The remote operation management device according to claim 1, wherein
    when an IP address related to the reception of the instruction for unlocking or opening includes a local IP address of the private IP network, the transmission area determination unit determines that the instruction for unlocking or opening has been received via the private IP network.

3. The remote operation management device according to claim 1, wherein
    the transmission area determination unit determines that the instruction for unlocking or opening has been received via the Internet when an IP address related to the reception of the instruction for unlocking or opening includes a local IP address other than a local IP address of the private IP network, and determines that the instruction for unlocking or opening has been received via the private IP network when the IP address related to the reception of the instruction for unlocking or opening includes only the local IP address of the private IP network.

4. The remote operation management device according to claim 1, wherein, when the facility security equipment is the electric lock:
    the network communication unit receives information on opening and closing from an open/close sensor configured to detect opening and closing of a door on which the electric lock is installed, and
    the operation instruction unit sends a locking instruction to the electric lock when the open/close sensor does not detect an open state within a predetermined time after sending an unlocking instruction to the electric lock.

5. The remote operation management device according to claim 1, wherein
    when the instruction for unlocking or opening has been received via the private IP network, the operation instruction unit requests the mobile communication terminal for information relating to user authentication, and sends the instruction for unlocking or opening to the facility security equipment when the information is acquired from the mobile communication terminal.

6. The remote operation management device according to claim 1, wherein
    when the instruction for unlocking or opening has been received via the private IP network, the operation instruction unit requests the mobile communication terminal for an input of a confirmation by a user, and sends the instruction for unlocking or opening to the facility security equipment when the confirmation is the input on the mobile communication terminal.

7. A remote operation management method for unlocking/locking or opening/closing facility security equipment related to security of a facility, comprising:
    receiving an instruction for a remote operation to unlock/lock or open/close the facility security equipment connected to a private Internet Protocol (IP) network of the facility from a device connected to the private IP network or to the Internet;
    determining if the instruction for unlocking or opening the facility security equipment has been received via the private IP network, delimited by a router, or via the Internet;
    sending the instruction for unlocking or opening to the facility security equipment only when the instruction for unlocking or opening has been received via the private IP network; and
    refraining from sending the instruction for unlocking or opening to the facility security equipment when the instruction for unlocking or opening has been received via the Internet, wherein
    the facility security equipment locks/unlocks or opens/closes in response to the instruction for unlocking or opening,
    the reception of the instruction for unlocking or opening via the private IP network comprises reception of the instruction for unlocking or opening from a mobile communication terminal using short-range wireless communication via a short-range wireless communication device connected to the private IP network, and
the facility security equipment comprises an electric lock, a shutter, or an opening/closing device for an electric window.

* * * * *